(12) United States Patent
Tagra et al.

(10) Patent No.: US 10,853,417 B2
(45) Date of Patent: Dec. 1, 2020

(54) GENERATING A PLATFORM-BASED REPRESENTATIVE IMAGE FOR A DIGITAL VIDEO

(71) Applicant: Adobe Inc., San Jose, CA (US)

(72) Inventors: Sanjeev Tagra, Panipat (IN); Sachin Soni, Palam Colony (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/104,509

(22) Filed: Aug. 17, 2018

(65) Prior Publication Data

US 2020/0057821 A1 Feb. 20, 2020

(51) Int. Cl.
| | | |
|---|---|---|
| *G06F 16/738* | (2019.01) | |
| *G06K 9/00* | (2006.01) | |
| *G06K 9/72* | (2006.01) | |
| *G10L 15/08* | (2006.01) | |
| *H04L 29/08* | (2006.01) | |
| *G06Q 30/02* | (2012.01) | |
| *G10L 15/22* | (2006.01) | |

(Continued)

(52) U.S. Cl.
CPC ....... *G06F 16/739* (2019.01); *G06K 9/00718* (2013.01); *G06K 9/00744* (2013.01); *G06K 9/00765* (2013.01); *G06K 9/726* (2013.01); *G06Q 30/0277* (2013.01); *G10L 15/08* (2013.01); *G10L 15/22* (2013.01); *H04L 67/10* (2013.01); *G06F 40/30* (2020.01); *G06K 2209/01* (2013.01); *G06Q 50/01* (2013.01); *G10L 2015/088* (2013.01)

(58) Field of Classification Search
CPC .................. G06K 9/00711; G06K 9/00765
See application file for complete search history.

(56) References Cited

U.S. PATENT DOCUMENTS

| | | | | |
|---|---|---|---|---|
| 9,330,171 | B1 * | 5/2016 | Shetty | ........................ G06T 3/00 |
| 10,057,651 | B1 * | 8/2018 | Singh | ................. H04N 21/4394 |
| 10,198,509 | B2 * | 2/2019 | Cheng | ..................... G06F 16/73 |

(Continued)

OTHER PUBLICATIONS

"How to create a custom YouTube Thumbnail," http://www.socialmediarocketeer.com/how-to-create-a-custom-youtube-thumbnail/, dated Oct. 21, 2017.

*Primary Examiner* — Amy Ng
*Assistant Examiner* — David Tan
(74) *Attorney, Agent, or Firm* — Keller Jolley Preece

(57) ABSTRACT

The present disclosure relates to systems, methods, and computer-readable media that generate a platform-specific representative image (e.g., a thumbnail image) for a digital video that is predicted to effectively engage users of a communication system (e.g., a social media system). For example, systems described herein include identifying keywords and associated engagement scores for the content sharing platform. The systems described herein further include identifying keywords associated with segments of the digital video. The systems can further determine a segment of interest based on the engagement scores for the content sharing platform and a semantic relationship between keywords for the content sharing platform and one or more keywords associated respective segments of the digital video. The system can further determine a representative image that effectively engages users of the sharing platform by determining a representative image from the identified segment of interest.

20 Claims, 8 Drawing Sheets

(51) Int. Cl.
    *G06Q 50/00*     (2012.01)
    *G06F 40/30*     (2020.01)

(56) References Cited

U.S. PATENT DOCUMENTS

| | | | |
|---|---|---|---|
| 10,275,535 B1* | 4/2019 | Trauth | G06F 16/9535 |
| 2011/0249861 A1* | 10/2011 | Tokutake | G11B 27/105 |
| | | | 382/103 |
| 2012/0210220 A1* | 8/2012 | Pendergast | G06F 3/0482 |
| | | | 715/716 |
| 2015/0235672 A1* | 8/2015 | Cudak | G11B 27/3081 |
| | | | 386/241 |
| 2016/0147760 A1* | 5/2016 | N | G06F 16/3322 |
| | | | 707/751 |
| 2018/0084023 A1* | 3/2018 | Stoop | H04L 65/602 |
| 2019/0104342 A1* | 4/2019 | Catalano | H04N 21/4662 |
| 2019/0149885 A1* | 5/2019 | Madison | H04N 21/2387 |
| | | | 715/838 |

* cited by examiner

700

Determining A First Set Of Keywords For A Content Sharing Platform Of A Communication System — 710

Identifying A Digital Video Including A Plurality Of Segments Associated With A Second Set Of Keywords To Share Via The Content Sharing Platform — 720

Identifying A Segment Of Interest From The Plurality Of Segments Based On A Correlation Score Between One Or More Keywords Corresponding To The Segment Of Interest And The First Set Of Keywords For The Content Sharing Platform — 730

Determining A Representative Image From The Segment Of Interest — 740

Providing The Representative Image Within A Display Of The Content Sharing Platform — 750

GENERATING A PLATFORM-BASED REPRESENTATIVE IMAGE FOR A DIGITAL VIDEO

BACKGROUND

Recent years have seen a rise in the use of computing devices (e.g., mobile devices, personal computers) to capture, store, and share digital media over a variety of platforms. Indeed, it is now common for individuals to use computing devices to share digital videos and images across a variety of communication platforms (e.g., social networking platforms and other digital communication platforms). In providing access to shared digital videos, many conventional systems display a thumbnail image representative of a corresponding digital video. For example, rather than streaming or otherwise playing back an entire video automatically upon opening a webpage or communication application, conventional systems often generate a thumbnail image that provides a preview of the digital video and playback the digital video only upon detecting a user selection of the thumbnail image. Conventional methods for displaying a thumbnail image representative of a shared digital video, however, suffer from a number of problems and inefficiencies.

For example, conventional systems for generating a thumbnail image for a corresponding digital video typically fail to accurately determine or identify a frame from the digital video that will effectively engage recipients of the digital video. For instance, many conventional systems simply identify a random video frame to use as a thumbnail image, resulting in a thumbnail image that fails to effectively engage prospective viewers of the digital video. Alternatively, some conventional systems analyze a digital video to identify a high-quality video frame. While identifying a high-quality video frame is generally more effective at engaging viewers than identifying a random video frame, simply identifying a high-quality video frame to use for a thumbnail image often fails to capture attention or engage a particular audience.

In addition, conventional systems often consume significant processing resources to non-randomly generate or otherwise identify a thumbnail image. For example, identifying a high-quality video frame often involves analyzing a large number of video frames across the duration of the digital video resulting in a computationally prohibitive process. Thus, conventional systems for generating thumbnail images generally consume significant processing resources thereby increasing processing costs and reducing effectiveness of computing devices utilized by conventional systems.

These and other problems exist with regard to generating and presenting representative images for a digital video.

SUMMARY

Embodiments of the present disclosure provide benefits and/or solve one or more of the foregoing and other problems in the art with systems, methods, and non-transitory computer-readable media that generate or otherwise identify representative images for digital videos presentation tailored to a particular communication platform on which the digital videos will be provided. In particular, in one or more embodiments, the disclosed systems observe engagement of users of a communication system (e.g., a social media system) with respect to digital content shared via a content sharing platform (e.g., a page of the social networking system) to identify keywords associated with various levels of engagement. In addition, the disclosed systems can identify keywords associated with segments of a digital video. The disclosed systems can further analyze correlations between the keywords associated with the content sharing platform and keywords associated with respective segments of the digital video to determine a representative image predicted to engage users of the communication system associated with the particular content sharing platform.

By identifying correlations between keywords of the content sharing platform and keywords corresponding to respective segments of a digital video, the disclosed systems can more accurately identify a representative image for the digital video expected to engage a particular group of users of the communication system. In addition, by considering keywords of the content sharing platform on which the digital video is shared, the disclosed systems can more flexibly identify different representative images for a number of different content sharing platforms.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which:

FIG. 7 illustrates a flow diagram of an example series of acts for generating a representative image for a digital video in accordance with one or more embodiments.

DETAILED DESCRIPTION

Figure 1:
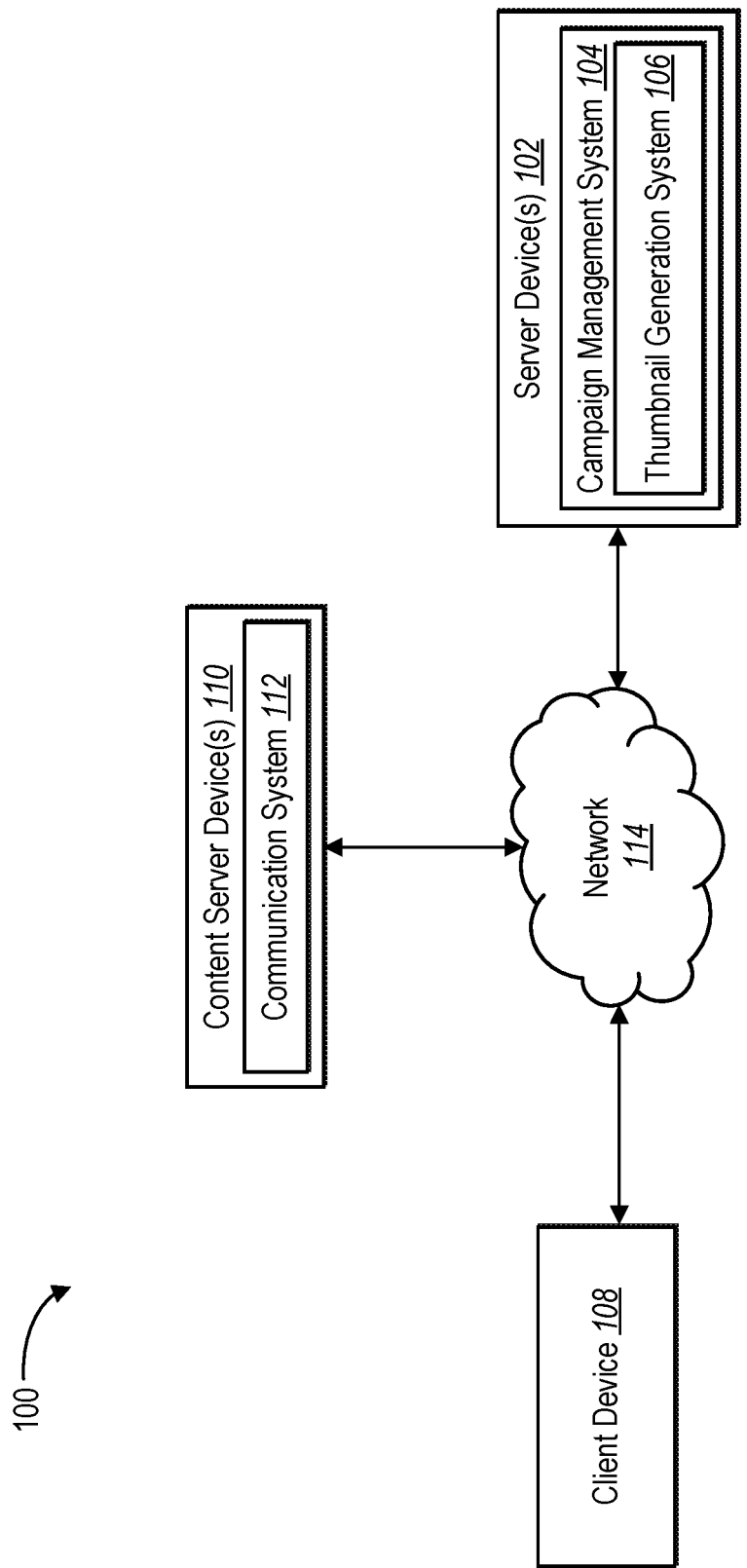
FIG. 1 illustrates a block diagram of an environment in which a thumbnail generation system is implemented in accordance with one or more embodiments.

One or more embodiments of the present disclosure include a thumbnail generation system that generates a representative image from a key segment of a digital video based on correlations between keywords associated with the segment of the digital video and keywords associated with a corresponding content sharing platform. For example, upon identifying a digital video to share with users of a communication system via a content sharing platform of the communication system (e.g., a group page, profile page), the thumbnail generation system can identify keywords associated with the content sharing platform. The thumbnail generation system can further identify keywords associated with segments of the digital video to determine (e.g., generate) a representative image (e.g., a thumbnail image) from a segment of interest of the digital video predicted to effectively engage users of the content sharing platform. As will be described in further detail below, in this manner, the thumbnail generation system can accurately, efficiently, and flexibly engage users across any number of content sharing platforms.

To illustrate, in one or more embodiments, the thumbnail generation system can receive or otherwise identify a digital video for sharing with users of a communication system. In particular, the thumbnail generation system can receive or identify a digital video to provide to a select group of users of the communication system that have access to a content sharing platform of the communication system (e.g., members of the content sharing platform). For example, the thumbnail generation system can receive a digital video from a user of the communication system to share with other users of the communication system. As another example, the thumbnail generation system can receive or identify a video advertisement to provide to users of the communication system via the content sharing platform.

In one or more embodiments, the thumbnail generation system determines keywords associated with the content sharing platform. For example, in one or more embodiments, the thumbnail generation system analyzes interactions by a plurality of users with respect to content (e.g. posts, comments, images, videos) shared via the content sharing platform. The thumbnail generation system can additionally identify one or more terms (e.g., keywords) associated with the shared content to determine keywords associated with different levels of engagement by the plurality of users having access to the content sharing platform. In particular, as will be described in further detail below, the thumbnail generation system can identify a plurality of keywords and determine engagement scores for the identified keywords unique to content shared via the content sharing platform.

In addition to determining keywords associated with the content sharing platform, the thumbnail generation system can additionally identify keywords associated with the digital video to be provided to users of the communication system via the content sharing platform. In particular, in one or more embodiments, the thumbnail generation system determines one or more keywords associated with respective segments (e.g., discrete clips) of the digital video. For example, the thumbnail generation system can divide the digital video into any number of discrete segments and identify one or more keywords corresponding to the respective segments of the digital video. As will be described in further detail below, the thumbnail generation system can analyze visual content, textual content, and audio content of individual segments of the digital video to determine one or more keywords associated with each of the respective video segments.

The thumbnail generation system can additionally identify a segment of interest from the digital video from which to generate a representative image. In particular, in one or more embodiments, the thumbnail generation system compares keywords corresponding to the content sharing platform with keywords corresponding to respective segments of the digital video to identify a segment of interest from the digital video including visual content (e.g., one or more video frames) predicted to more effectively engage users associated with the content sharing platform than content from other segments of the digital video.

Upon identifying the segment of interest, the thumbnail generation system can generate a representative image for the digital video from the segment of interest. For example, the thumbnail generation system can identify a video frame from the segment of interest to use as the representative image. As another example, the thumbnail generation system can generate a thumbnail image having a lower resolution than the identified frame and utilize the thumbnail image as the representative image for the digital video. In either example, the thumbnail generation system can provide the representative image via a display of the content sharing platform.

The thumbnail generation system provides a number of advantages over conventional systems. For example, by identifying a segment of interest associated with keywords that correspond to digital content items (e.g., shared images, videos, comments, posts) having a history of engaging users of the content sharing platform, the thumbnail generation system can generate a representative image predicted to effectively engage users of the content sharing platform. Indeed, rather than generating a random image from the digital video or simply identifying any high-quality image at an arbitrary point of the digital video to use as a representative image, the thumbnail generation system can more effectively engage users of the content sharing platform, resulting in higher click rates and interaction with digital videos shared via the communication system.

In addition, by comparing keywords from the respective segments with keywords particular to a content sharing platform, the thumbnail generation system can generate a representative image unique to any number of content sharing platforms. For example, rather than identifying a generic thumbnail image to use as a representative image for the digital video across multiple content sharing platforms, the thumbnail generation system can generate different representative images for different content sharing platforms predicted to effectively engage different groups of users that access the respective content sharing platforms. Accordingly, the thumbnail generation system can more flexibly target different demographics of users of the communication system associated with respective content sharing platforms.

Moreover, by comparing keywords between the content sharing platform and segments of the digital video to selectively identify a segment of interest, the thumbnail generation system significantly reduces consumption of processing power over conventional systems. Indeed, by isolating a segment of interest and generating the representative image from a selected segment of interest rather than analyzing content over an entire duration of the digital video, the thumbnail generation system can identify a representative image without analyzing content over the entire duration of the digital video when generating the representative image. Accordingly, the thumbnail generation system can analyze significantly fewer video frames of the digital video in generating the representative image which significantly reduces computational expense over conventional systems, thereby resulting in a significant improvement to the computer system on which the thumbnail generation system (e.g., communication system server) is implemented.

As illustrated in the foregoing discussion, the present disclosure utilizes a variety of terms to described features and advantages of the thumbnail generation system. Additional detail is now provided regarding the meaning of such terms. For instance, as used herein, a "digital video" refers to digital data representative of a sequence of visual images.

By way of example, a digital video may refer to a digital file having one of the following file extensions: AVI, FLV, WMV, MOV, MP4. Thus, a digital video includes digital data or a digital file for a video that is displayable via a graphical user interface of a display of a computing device. Thus, a digital video includes digital data or a digital file for a video that is displayable via a graphical user interface of a display of a computing device. A digital video may have a corresponding frame rate, resolution, or duration. In addition, a digital video may include data or information about the digital video file (e.g., metadata). Moreover, in addition to visual content, a digital video may include additional types of content (e.g., audio content) that a viewer experiences when viewing a presentation of the digital video.

In addition, a digital video may include any number of segments. As used herein, a "segment" or "video segment" refers to a discrete portion or clip of consecutive content from a digital video. For example, a segment of a digital video may refer to a clip of the digital video including any number of consecutive video frames (e.g., depending on a frame rate of the digital video). In one or more embodiments, a plurality of segments of a digital video refers to non-overlapping clips of the digital video. Alternatively, one or more of the plurality of segments may partially overlap. As will be described in further detail below, the thumbnail generation system can divide a digital video into any number of segments.

As mentioned above, the thumbnail generation system can provide a digital video to users of a communication system via a content sharing platform of the communication system. As used herein, a "communication system" may refer to one of a variety of different communication systems including, by way of example, a social media system, an electronic messaging system, a collection of associated webpages, or other networking platform over which users of the communication system can share and access digital content (e.g., digital content items) with other users of the communication system. In addition, as used herein, a "user" of the communication system can refer to any user or other entity having access to digital content shared via the communication system. A user may also refer to any entity having the capability to share digital content with other users of the communication system.

As used herein, a "digital content item" or "digital content" refers to an electronic item. In particular, a digital content item includes an electronic item provided for display within a content sharing platform of the communication system. Examples of digital content items include digital images, digital videos, digital text, an electronic document, a digital link, an original or shared post to a content sharing platform, or other type of digital content provided to users of the communication system having access to a content sharing platform.

As mentioned above, users of the communication system can share and/or access digital content items provided via a content sharing platform of the communication system. As used herein, a "content sharing platform" refers to a page (e.g., a profile page, group page), room (e.g., forum, chatroom), or other virtual space associated with the communication system over which one or more users of the communication system can share and access digital content items with other users of the communication system. By way of example, in one or more embodiments described herein, a content sharing platform refers to a page accessible to users generally or a subset of users of the communication system hosted or otherwise provided by the communication system. Nonetheless, while one or more embodiments described herein relate specifically to a content sharing platform which includes a group page or profile page of a social network, features and functionality described in connection with the group page can similarly apply to any type of content sharing platform over which users of a communication system can share and access digital content items.

As will be described in further detail herein, the thumbnail generation system can generate a representative image for a digital video. As used herein, a "representative image" refers to a digital image representative of a digital video provided to users of the communication system via a content sharing platform. For example, a representative image may refer to a thumbnail image that includes a single video frame or series of multiple video frames (e.g. an animated GIF) of a digital video that provides a visual preview of the digital video to one or more users of the communication system. In one or more embodiments, the representative image may include a selectable image that enables a user of a client device to select the image and, in response, access the digital video represented by the representative image via the content sharing platform. As will be described in further detail below, the thumbnail generation system can generate and provide a representative image for display via a content sharing platform (e.g., via a graphical user interface of a client device displaying at least a portion of the content sharing platform).

As will be described in further detail below, the thumbnail generation system can identify keywords associated with the content sharing platform and respective segments of a digital video. As used herein, a "keyword" refers to one or more terms associated with a respective digital content item (e.g., an image, video, post, comment, document, etc.). In addition, a keyword may refer to one or more terms associated with an individual segment of a digital video. As will be described in further detail below, a keyword may be represented by a keyword vector within a d-dimensional vector space.

In one or more embodiments described herein, the thumbnail generation system determines a semantic relationship or semantic correlation between identified keywords. As used herein, a "semantic relationship" or "semantic correlation" between two keywords refers to a similarity metric between the two keywords. For example, in one or more examples described herein, a semantic relationship between keywords refers to a distance between points on a vector plane where the points refer to vector representations of the keywords. As an example, in one or more embodiments, a semantic relationship between a first keyword and a second keyword refers to a Euclidean distance between a first point on a vector plane representative of a vector representation of the first keyword and a second point on the vector plane representative of a vector representation of the second keyword.

Additional detail will now be provided regarding the thumbnail generation system in relation to illustrative figures portraying example embodiments. For example, FIG. 1 illustrates an example environment 100 for generating representative images for digital videos provided via a content sharing platform of a communication system. As shown in FIG. 1, the environment 100 includes a server device(s) 102 including a campaign management system 104 and a thumbnail generation system 106. The environment 100 further includes a client device 108. As shown in FIG. 1, the environment further includes content server device(s) 110 including a communication system 112 implemented thereon.

Each of the client device 108 and content server device(s) 110 may communicate with the server device(s) 102 by way of the network 114, as shown. The network 114 may include one or multiple networks and may use one or more communication platforms or technologies suitable for transmitting data. For example, in one or more embodiments, the content server device(s) 110 may communicate with the server device(s) 102 by way of a first network while the client device 108 communicates with the content server device(s) 110 and/or server device(s) 102 by way of a second network. In one or more embodiments, the network 114 includes the Internet or World Wide Web. In addition, or as an alternative, the network 114 can include other types of communication networks as described below (e.g., in relation to FIG. 8).

Moreover, the client device 108 may refer to various types of computing devices. For example, the client device 108 may include a mobile device such as a mobile telephone, a smartphone, a PDA, a tablet, or a laptop. Additionally, or alternatively, the client device 108 may include a non-mobile device such as a desktop computer. In addition, as mentioned above, the environment 100 includes the server device(s) 102 and content server device(s) 110, which may generate, store, receive, and/or transmit any type of data over the network 114. In addition, as mentioned above, the environment 100 includes the server device(s) 102 and the content server device(s) 110. The server device(s) 102, 110 can generate, store, receive, and/or transmit any type of data, including digital content items, including digital videos to the client device 108. Additional detail regarding client devices and server devices is provided below (e.g., in relation to FIG. 8).

As mentioned above, and as shown in FIG. 1, the server device(s) 102 can include the campaign management system 104 and the thumbnail generation system 106. The campaign management system 104 can manage, operate, run, and/or execute a digital content campaign. For example, the digital campaign management system 104 can receive digital content from a publisher or advertiser, receive or generate campaign parameters (e.g., a budget, campaign duration, or content selection policies), and then facilitate distribution of digital content to one or more client devices. For example, in one or more embodiments, the campaign management system 104 determines one or more digital videos to provide to a particular client device or group of client devices. For instance, the campaign management system 104 can identify a digital video for distribution and provide the digital video to the communication system 112 for distribution via a content sharing platform associated with a particular group of users. The campaign management system 104 can identify the digital video based on any number of criteria including, for example, demographics of a target audience, or information associated with a content sharing platform or users of the content sharing platform.

As further shown in FIG. 1, the campaign management system 104 includes a thumbnail generation system 106 which determines (e.g., selects, generates) a representative image to use when providing a digital video to users of the communication system 112 via a particular content sharing platform. Indeed, as mentioned above, the thumbnail generation system 106 can identify and compare a first set of keywords associated with a content sharing platform to a second set of keywords associated with segments of a digital video to generate a representative image to provide for display when providing access to the digital video to users of the content sharing platform. Additional detail with regard to identifying and comparing keywords between the content sharing platform and segments of the digital video will be described in further detail below.

As shown in FIG. 1, the campaign management system 104 and the thumbnail generation system 106 are implemented on the server device(s) 102. Nevertheless, in one or more embodiments, the campaign management system 104 and/or thumbnail generation system 106 are implemented in whole (or in part) on one or a combination of the client device 108 and/or content server device(s) 110. As an example, in one or more embodiments, the communication system 112 receives a digital video (e.g., from the server device(s) 102 or a client device of any user of the communication system 112) to provide to users of a content management platform hosted by the communication system 112 and utilizes the thumbnail generation system 106 implemented thereon to generate a representative image to use in providing a selectable preview via a graphical user interface of the client device 108 that enables a user of the client device 108 to access the digital video.

Figure 2:
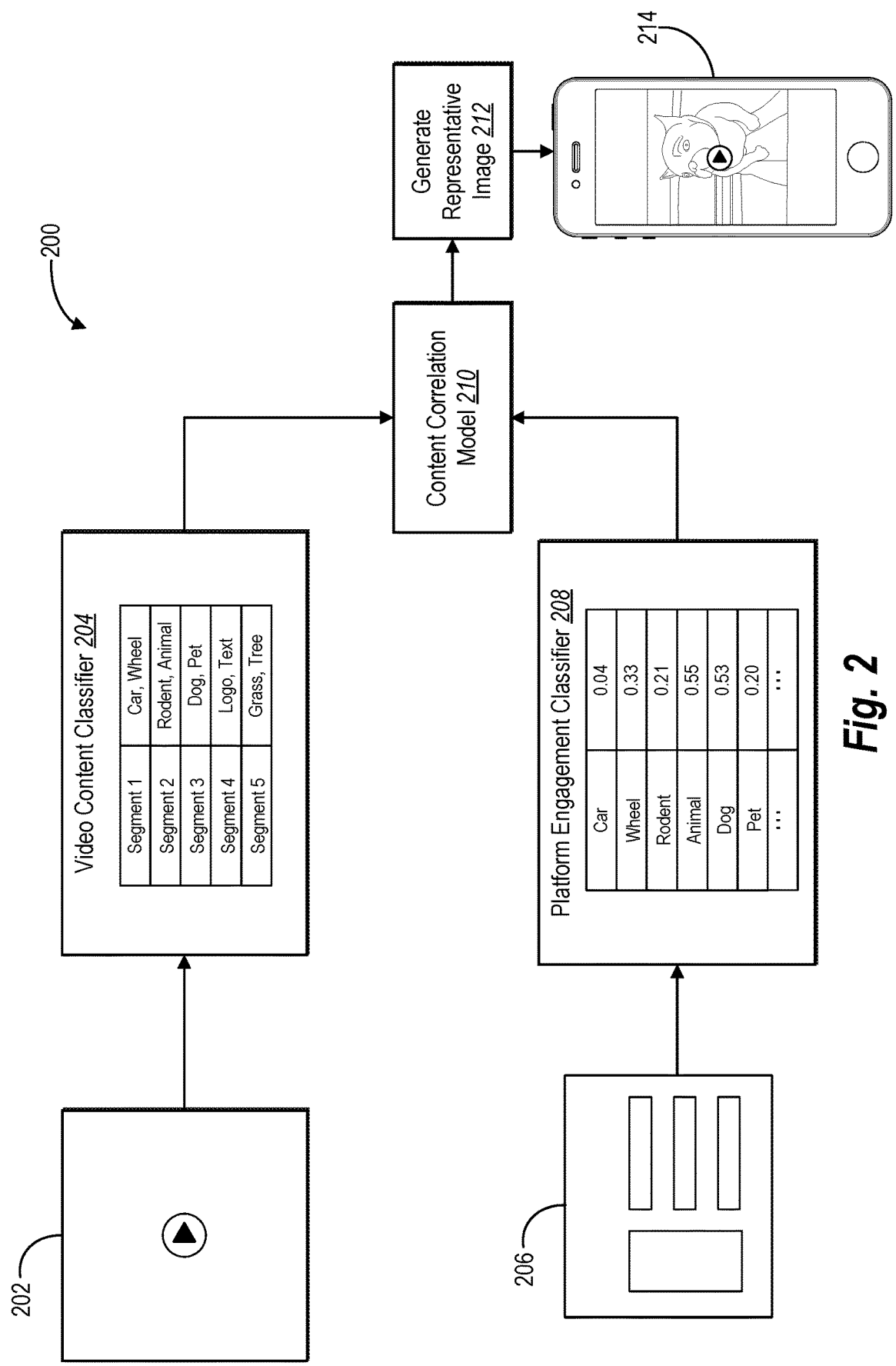
FIG. 2 illustrates an overview of a process of generating a representative image for a digital video in accordance with one or more embodiments.

FIG. 2 illustrates an example framework for generating a representative image for a digital video provided to users of a content sharing platform of the communication system 112. In particular, FIG. 2 illustrates an example thumbnail generation model 200 including a video content classifier 204, a platform engagement classifier 208, and a content correlation model 210 in accordance with one or more embodiments described herein. In particular, FIG. 2 illustrates an example in which the thumbnail generation system 106 utilizes the framework of the thumbnail generation model 200 to generate a representative image for a digital video 202 to provide via a graphical user interface of a client device 108 associated with a user that follows, subscribes to, or otherwise has access to a content sharing platform 206 of the communication system 112.

In the example shown in FIG. 2 (and in other examples described below), the digital video 202 may refer to any digital video provided to users of the communication system 112 via a content sharing platform 206 of the communication system 112. For example, the digital video 202 may refer to a digital advertisement (e.g., a digital video ad) provided via a newsfeed, user profile, group page profile, or other content sharing platform hosted by or otherwise associated with the communication system 112. As another example, the digital video 202 may refer to any digital video shared by a user of the communication system 112 with other users of the communication network 112 via a newsfeed, user profile, group page profile, or other content sharing platform associated with the communication system 112.

As shown in FIG. 2, the thumbnail generation system 106 can utilize the video content classifier 204 to determine a plurality of keywords associated with segments of the digital video 202. For example, as shown in FIG. 2, the thumbnail generation system 106 divides or otherwise identifies segments of the digital video 202 and identifies one or more keywords associated with each respective segment of the digital video 202. As will be described in further detail below, the thumbnail generation system 106 can analyze content of each segment of the digital video 202 including visual content, audio content, and displayed textual content to determine any number of keywords associated with each segment of the digital video 202. In one or more embodiments, the thumbnail generation system 106 compiles or otherwise generates a record of segments and corresponding keywords representative of the segments of the digital video.

As further shown in FIG. 2, the thumbnail generation system 106 can utilize the platform engagement classifier 208 to determine one or more keywords associated with the content sharing platform 206 of the communication system 112. For example, as shown in FIG. 2, the thumbnail generation system 106 can analyze content shared via the content sharing platform 206 to identify any number of keywords associated with the content sharing platform. As will be described in further detail below, the thumbnail generation system 106 can identify keywords for the content sharing platform 206 by analyzing digital content items previously shared to users of the communication system 112 via the content sharing platform 206. For example, the thumbnail generation system 106 can analyze visual content, audio content, and/or textual content of images, videos, posts, comments, and other digital content items shared via the content sharing platform.

In addition to generally identifying keywords associated with the content sharing platform 206, the thumbnail generation system 106 can additionally utilize the platform engagement classifier 208 to determine levels of engagement by users of the communication system 112 with respect to the identified keywords. For example, as shown in FIG. 2 and as will be described in further detail below, the thumbnail generation system 106 can determine an engagement score corresponding to each of the identified keywords based on interactions by users of the communication system 112 with respect to content shared via the content sharing platform 206. As used herein, an "interaction" or "user interaction" with a digital content item refers to tracked interactions by users of the communication system 112 with regard to the digital content item provided via a content sharing platform of the communication system 112. By way of example, an interaction may refer to one or more of a like, comment, share, forward, view, conversion, download or other trackable action by a user of the communication system 112 with regard to a digital content item shared via a content sharing platform.

The thumbnail generation system 106 can additionally train and/or utilize a content correlation model 210 to determine a representative image from the digital video 202 to use as a preview image for the digital video 202 provided to users of the communication system 112 via the content sharing platform 206. In particular, the thumbnail generation system 106 can utilize the content correlation model 210 to determine correlations between keywords for the individual segments of the digital video 202 and keywords for the content sharing platform 206. In particular, the thumbnail generation system 106 can compare keywords from the segments of the digital video 202 with important or engaging keywords (e.g., keywords associated with threshold engagement scores) associated with the content sharing platform 206 to determine correlation scores associated with the segments of the digital video 202. The thumbnail generation system 106 can additionally determine a segment of interest by identifying a segment from a plurality of segments having the highest correlation score with respect to the keywords associated with the content sharing platform 206. Additional detail with regard to determining the correlation score(s) for the segments of the digital video 202 will be described below.

Upon identifying the segment of interest from the digital video 202, the thumbnail generation system 106 can perform an act 212 of generating a representative image for the digital video 202 to present via a display of the content sharing platform 206 (e.g., via a graphical user interface of a client device 108 displaying content of the content sharing platform 206). For example, the thumbnail generation system 106 can identify a video frame of the segment of interest to use as a thumbnail image for display within an interface of the content sharing platform 206. As another example, the thumbnail generation system 106 can generate a reduced resolution thumbnail image to use as a preview for the digital video within an interface of the content sharing platform 206. In one or more embodiments, the thumbnail generation system 106 generates a representative image including multiple video frames (e.g., a Graphics Interchange Format (GIF) digital file) from the segment of interest to utilize as a preview for the digital video 202 within the content sharing platform 206.

Upon generating the representative image, the thumbnail generation system 106 can provide the representative image for display via a graphical user interface of a client device 214 having access to the content sharing platform 206. For example, the thumbnail generation system 106 can post the digital video 202 to the content sharing platform 206 by displaying the representative image within a presentation of the content sharing platform 206 (e.g., within a graphical user interface of the client device 214). In one or more embodiments, in response to detecting a user selection of the representative image, the client device 214 can download or otherwise access the digital video 202 and stream, playback, or otherwise present the digital video 202 via the graphical user interface of the client device 214.

Figure 3:
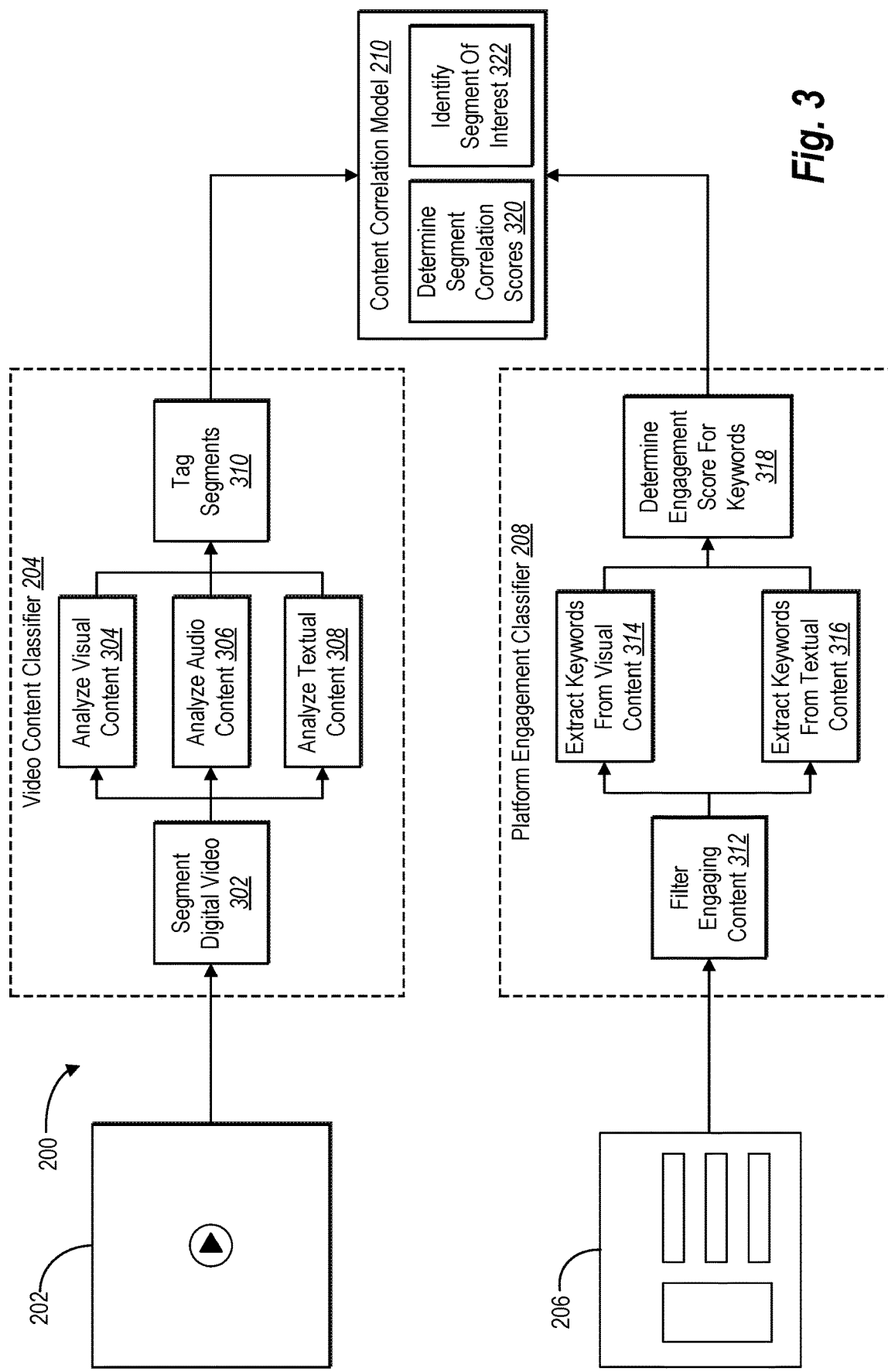
FIG. 3 illustrates an overview of a process of generating a representative image for a digital video in accordance with one or more embodiments.

FIG. 3 illustrates an additional information and details regarding the framework of the thumbnail generation model 200 for generating a representative image for a digital video for display via a content sharing platform of the communication system 112. Indeed, in relation to the embodiment of FIG. 3, the thumbnail generation model 200 includes a video content classifier 204 for identifying keywords associated with segments of the digital video 202. In addition, the thumbnail generation model 200 includes a platform engagement classifier 208 for identifying keywords and associated engagement scores associated with a content sharing platform 206. Further, the thumbnail generation model 200 includes a content correlation model 210 for identifying a segment of interest predicted to effectively engage users of the networking system 112 who visit, view, or otherwise access digital content items presented via the content sharing platform 206. Indeed, in relation to the embodiment of FIG. 3, components of the prediction model include similar features and functionality described above in connection with FIG. 2, in addition to additional features and functionality described below.

As mentioned above, the thumbnail generation system 106 can utilize the video content classifier 204 to generate or otherwise identify any number of keywords associated with respective segments of the digital video 202. In particular, as shown in FIG. 3, in one or more embodiments, the thumbnail generation system 106 performs an act 302 of segmenting the digital video 202. As mentioned above, the thumbnail generation system 106 can divide the digital video 202 into any number of segments or clips.

The thumbnail generation system 106 can divide the digital video 202 into segments in a variety of ways. As a first example, in one or more embodiments, the thumbnail generation system 106 randomly identifies segments (e.g., of a predetermined length) over a duration of the digital video 202. For instance, the thumbnail generation system 106 can divide the digital video 202 into a predetermined number of segments or, alternatively, divide the digital video into clips of equal or similar length that span the duration of the digital video 202. In one or more embodiments, the thumbnail generation system 106 divides the digital video 202 into a number segments having a particular length where the number of segments and length of the segments depends on a duration of the digital video 202.

As another example, the thumbnail generation system 106 can detect or otherwise determine breaks in the digital video 202 and divide the digital video 202 into scenes. For instance, the thumbnail generation system 106 can detect non-continuities or cuts between video frames, abrupt changes in visual content over a series of video frames, or simply extract data from a video file (e.g., scene metadata) to identify scenes of the digital video 202 and divide the digital video 202 into segments corresponding to the detected scenes. It will be understood that the thumbnail generation system 106 can utilize a variety of different known methods or algorithms to detect scenes of the digital video 202.

Upon dividing the digital video 202 into any number of segments, the thumbnail generation system 106 can additionally utilize the video content classifier 204 to analyze content of the individual segments. For example, as shown in FIG. 3, the thumbnail generation system 106 can perform an act 304 of analyzing visual content, an act 306 of analyzing audio content, and/or an act 308 of analyzing textual content of the digital video. In one or more embodiments, the thumbnail generation system 106 can analyze visual, audio, and/or textual content for each of the plurality of segments. Alternatively, for one or more of the identified segments, the thumbnail generation system 106 can omit one or more of the acts 304, 306, 308 of analysis for a corresponding segment (e.g., where no textual or audio content exists for a particular segment).

The thumbnail generation system 106 can analyze visual content, audio content, and/or textual content to identify keywords in a number of ways. For example, with regard to the act 304 of analyzing visual content, the thumbnail generation system 106 can utilize a deep learning model (e.g., a convolutional neural network) to analyze frames of the digital video 202 and extract keywords associated with one or a series of multiple frames within a corresponding segment. In particular, the thumbnail generation system 106 can utilize a deep learning model trained to analyze a sequence of video frames to identify objects or other displayed content within the video frames and extract video metadata for a segment of the digital video 202 including any number of video frames. For example, the thumbnail generation system 106 can utilize the systems and methods described in U.S. patent application Ser. No. 15/921,492, filed on Mar. 14, 2018, and entitled Detecting Objects Using a Weakly Supervised Model, the entire contents of which are hereby incorporated by references. In one or more embodiments, the thumbnail generation system 106 determines keywords based on the visual content of the digital video 202 by utilizing a cloud-based video intelligence model (e.g., Google Cloud Video Intelligence API).

In addition, with regard to the act 306 of analyzing audio content, the thumbnail generation system 106 can extract keywords based on audio of each of the identified segments of the digital video 202. In one or more embodiments, the thumbnail generation system 106 utilizes a speech to text algorithm to extract one or more keywords corresponding to words spoken or otherwise presented via the corresponding segment of the digital video 202. In one or more embodiments, the thumbnail generation system 106 utilizes one or more deep learning models (e.g., deep forward neural networks, recurrent neural networks) trained to detect and recognize keywords spoken in one or multiple languages.

Furthermore, with regard to the act 308 of analyzing textual content, the thumbnail generation system 106 can extract keywords based on detected text displayed within the respective segments of the digital video 202. For example, where one or more video frames of the segment includes displayed text, the thumbnail generation system 106 can utilize optical character recognition (or other text recognition model) to detect text within the video frame(s) of a segment. The thumbnail generation system 106 can additional extract one or more keywords associated with the segment from the detected text within the video frame(s).

Upon identifying any number of terms associated with the segment based on the visual analysis, audio analysis, and/or textual analysis of the segment, the thumbnail generation system 106 can additionally perform an act 310 of tagging the segment with one or more keywords from the detected terms. For example, the thumbnail generation system 106 can consider results of performing each of the visual analysis, audio analysis, and textual analysis for a segment to determine one or more keywords to tag or otherwise associate with the segment of the digital video 202. In particular, in one or more embodiments, the thumbnail generation system 106 determines which of the detected terms are most relevant and tags the segment of the digital video 202 with the most relevant of the terms (e.g., keywords).

In one or more embodiments, the thumbnail generation system 106 identifies or otherwise determines confidence values indicative of relevance of a particular term with the segment. In particular, the confidence value may indicate with a high or low level of confidence that a particular term is indeed associated with a corresponding segment. For example, where performing one or more of the visual analysis, audio analysis, and the textual analysis yields a high confidence value for a particular term (e.g., a confidence value that exceeds a threshold confidence value), the thumbnail generation system 106 can determine that the term is a keyword for the corresponding segment and tag the segment with the keyword. Alternatively, where performing one or more of the analyses yields a low confidence value for a term (e.g., a confidence value below the threshold confidence value), the thumbnail generation system 106 can disregard the term rather than tagging the term as a keyword for the corresponding segment of the digital video 202. In one or more embodiments, the thumbnail generation system 106 identifies a predetermined number of the keywords corresponding to terms associated with higher confidence values than other identified terms associated with lower confidence values.

Once keywords are determined for the segments, in one or more embodiments, the thumbnail generation system 106 generates word vectors representative of keywords (e.g., keyword vectors) for the corresponding segments of the digital video. For example, the thumbnail generation system 106 can generate a keyword vector in a d-dimensional space (e.g., d~300) representative of an identified keyword and tags the segment of the digital video 202 with the keyword vector. In accordance with one or more embodiments described above, the thumbnail generation system 106 can tag any number of keyword vectors to metadata of a corresponding segment of the digital video 202. In one or more embodiments, the thumbnail generation system 106 utilizes the "word2vec" model in generating the keyword vectors to represent the identified keywords associated with the corresponding segments of the digital video 202. To illustrate, the thumbnail generation system 106 can utilize the word to vector algorithm, "word2vec" as described in Mikolov, Tomas; Sutskever, Ilya; Chen, Kai; Corrado, Greg S.; Dean, Jeff, Distributed representations of words and phrases and their compositionality, NIPS 2013, the entire contents of which are hereby incorporated by reference.

As mentioned above, the thumbnail generation system 106 can additionally utilize the platform engagement classifier 208 to determine a plurality of keywords associated with the content sharing platform 206 and further determine a level of engagement for each of the identified keywords. As shown in FIG. 3, the thumbnail generation system 106 can perform an act 312 of filtering engaging content of the content sharing platform 206. For example, the thumbnail generation system 106 can identify digital content items having a high engagement score (e.g., an engagement score that exceeds a threshold engagement score) while disregarding one or more digital content items having a low engagement score (e.g., an engagement score below a threshold engagement score).

For example, in one or more embodiments, the thumbnail generation system 106 iteratively analyzes each of the digital content items shared, posted, or provided via the content sharing platform 206 of the networking system 112. In particular, the thumbnail generation system 106 can track or otherwise identify interactions by users of the networking system 112 with respect to the digital content items. In one or more embodiments, the thumbnail generation system 106 identifies the interactions by extracting public data from the content sharing platform 206 using a platform specific application programming interface (API) (e.g., a social media page API). In one or more embodiments, the public data includes information associated with each shared digital content item including, for example, a number of comments, likes, and/or shares for the digital content items.

In one or more embodiments, the thumbnail generation system 106 generates an engagement score for each digital content items provided via the content sharing platform 206. For instance, for given digital content item, the thumbnail generation system 106 can determine a score based on a number of likes, comments, and shares. As an illustrative example, with regard to a post on a social media platform, the thumbnail generation system 106 can calculate an engagement score (P) for the post using the following formula:

$$P = w_1(N_{likes}) + w_2(N_{comments}) + w_3(N_{shares})$$

where $N_{likes}$ refers to a number of "likes" or other user-rating, $N_{comments}$ refers to a number of comments, $N_{shares}$ refers to a number of shares of the post, and $w_1$, $w_2$, and $w_3$ refer to weights corresponding to the different types of interactions. The weights may have default values of $w_1=1$, $w_2=2$, and $w_3=3$, which can be modified by a marketer, content publisher, or administrative user associated with the campaign management system 104 (e.g., depending on a particular conversion or engagement goal).

As mentioned above, the thumbnail generation system 106 can filter the engaging content by determining which of the digital content items provided via the content sharing platform 206 satisfy a particular threshold. For example, the thumbnail generation system 106 can identify any digital content items having an engagement score that exceeds a threshold engagement score for further analysis (e.g., text extraction) while disregarding any digital content items having an engagement score below the threshold. In this way, the thumbnail generation system 106 avoids considering irrelevant or non-engaging digital content items, which limits further analysis to the most relevant digital content items while conserving processing resources of the server device(s) 102 (and/or content server device(s) 110).

As mentioned above, the thumbnail generation system 106 can perform additional analysis on those digital content items having higher engagement scores. As shown in FIG. 3, the thumbnail generation system 106 utilizes the platform engagement classifier 208 to perform an act 314 of extracting one or more keywords from visual content of the identified digital content items. In particular, the thumbnail generation system 106 can analyze visual content of a digital image to detect objects or other content displayed within the digital content item and extract keywords associated with the displayed content. In one or more embodiments, the thumbnail generation system 106 utilizes a deep learning model (e.g., a convolutional neural network) to detect objects and/or extract keywords associated with the displayed content of the digital content item. In one or more embodiments, the thumbnail generation system 106 extracts keywords from the visual content using various models including a cloud-based extraction model (e.g., Google Vision API) or an image tagging model (e.g., Adobe Image Tagging).

The thumbnail generation system 106 can additionally perform an act 316 of extracting one or more keywords from textual content of the identified digital content items. For example, where a digital content item refers to a post or comment including textual content, the thumbnail generation system 106 can perform a natural language analysis to parse the textual content and identify one or more keywords from the textual content of the digital content item. In one or more embodiments, the thumbnail generation system 106 extracts one or more keywords using a natural language toolkit or other natural language API to extract one or more keywords from the digital content item.

Similar to the keywords identified in connection with the segments of the digital video 202, the thumbnail generation system 106 can similarly represent the keywords extracted from the digital content items provided via the content sharing platform 206 as vectors. For example, in one or more embodiments, the thumbnail generation system 106 represents the keywords for the content sharing platform 206 as keyword vectors in a d-dimensional space (e.g., d~300) representative of the extracted terms from the visual content and/or textual content of the digital content items. In one or more embodiments, the thumbnail generation system 106 utilizes the "word2vec" model to generate the keyword vectors for the keywords extracted from the digital content item(s).

As shown in FIG. 3, the thumbnail generation system 106 can additionally perform an act 318 of determining engagement scores for a plurality of keywords extracted from the digital content items (e.g., the digital content items provided via the content sharing platform 206 identified as engaging). In one or more embodiments, the thumbnail generation system 106 generates record of keywords and corresponding engagement scores by compiling a list of keywords associated with digital content items of the content sharing platform 206 and associating engagement scores for the digital content items with the list of keywords. For example, where the thumbnail generation system 106 extracts a keyword of "nature" from a digital content item and determines an engagement score (P) for the digital content item to be 0.50, the thumbnail generation system 106 can generate a record of keywords including "animal" and a corresponding engagement score (e.g., an integer, percentage, or other numerical value). As another example, where the thumbnail generation system 106 identifies multiple keywords from the digital content item, the thumbnail generation system 106 can generate a record including each of the keywords and associate the same engagement score to each of the identifies keywords associated with the corresponding digital content item.

In one or more embodiments, the thumbnail generation system 106 iteratively generates and updates entries to the record of keywords for the content sharing platform 206. For example, the thumbnail generation system 106 can iteratively analyze each digital content item of the content sharing platform 206 to identify one or more keywords and corresponding engagement score(s) and either add or update the record of keywords to reflect the identified keywords and engagement scores. For instance, where an identified keyword is not present in the record of keywords, the thumbnail generation system 106 can add the identified keyword to the record with the engagement score associated with the corresponding digital content item.

Alternatively, where an identified keyword for a digital content item is already present in the record of keywords (e.g., the keyword and corresponding engagement score was previously identified in connection with another digital content item), the thumbnail generation system 106 can update the engagement score for the keyword already present in the record of keywords by incrementing the engagement score from the record of keywords with the engagement score for the digital content item. For example, the thumbnail generation system 106 can increase or decrease a value of the engagement score for the keyword based on a level of engagement with the digital content item. In addition, the thumbnail generation system 106 can periodically update the record of keywords as additional digital content items are added to the content sharing platform and as users of the networking system interact with digital content items of the content sharing platform 206.

Upon extracting or otherwise determining keywords for the segments of the digital video 204 and the content sharing platform 206, the thumbnail generation system 106 can additionally utilize the content correlation model 210 to identify a segment of interest of the digital video 202 predicted to more effectively engage users of the networking system 112 that view, interact with, or otherwise access the content sharing platform 206. For example, as shown in FIG. 3, the thumbnail generation system 106 can perform an act 320 of determining segment correlation scores between the segments of the digital video 204 and the content sharing platform 206. In particular, the thumbnail generation system 106 can determine correlation scores between a first set of one or more keywords of segments of the digital video 202 identified using the video content classifier 204 and a second set of one or more keywords for the content sharing platform 206 identified using the platform engagement classifier 208.

In one or more embodiments, the thumbnail generation system 106 determines a correlation score for each of the plurality of segments of the digital video 202. In particular, the thumbnail generation system 106 can determine a correlation score between one or more keywords of a segment and one or more keywords of a content sharing platform based on a semantic relationship (e.g., a semantic correlation) between the keywords and a level of engagement (e.g., an engagement score) with digital content items associated with the keywords of the content sharing platform 206. In particular, in one or more embodiments, the thumbnail generation system 106 can determine a correlation score for each of the segments of the digital video 202 based on a ratio of a semantic relationship between sets of keywords and one or more engagement scores associated with the set of keywords associated with the content sharing platform 206.

The thumbnail generation system 106 can determine a correlation score in a variety of ways. As an example, the thumbnail generation system 106 can identify important keywords (e.g., important keywords $K_p$) from a set of keywords associated with the content sharing platform 206. In particular, the thumbnail generation system 106 can identify one or more keywords (e.g., a subset of the record of keywords) from the plurality of keywords having higher engagement scores than other keywords from the plurality of keywords associated with the content sharing platform 206. In one or more embodiments, the thumbnail generation system 106 identifies a predetermined number of the keywords having the highest engagement scores from the set of keywords representative of the content sharing platform 206 (e.g., the ten most engaging keywords from the record of keywords).

As noted above, the keywords associated with the content sharing platform 206 may be represented by word vectors in a d-dimensional space (e.g., d—300). In one or more embodiments, the thumbnail generation system 106 generates the keyword vectors for the identified important keywords (e.g., where the keyword vectors were not previously generated for other identified keywords associated with digital content items of the content sharing platform 206). In addition, as will be discussed in further detail below, a distance between any two points on the d-dimensional space (e.g., corresponding to the vector representations for the keywords) represents a semantic relationship between two words represented by the two points.

To determine a correlation score for a segment of the digital video 202, the thumbnail generation system 106 can determine a semantic relationship between segment keywords $K_c$ (e.g., keywords of the segment previously identified using the video content classifier 204) and the important keywords $K_p$ of the content sharing platform 206. In one or more embodiments, the thumbnail generation system 106 determines the semantic relationship by calculating a distance on the d-dimensional vector space between one or more of the segment keywords $K_c$ and one or more of the important keywords $K_p$ of the content sharing platform 206. For example, the thumbnail generation system 106 can calculate a Euclidean distance (d(x, y)) between a first word vector (x) (e.g., referring to a keyword vector from the important keywords $K_p$ of the content sharing platform 206) and a second word vector (y) (e.g., referring to a keyword vector from the segment keywords $K_r$).

In determining the correlation score for the segment, the thumbnail generation system 106 determines a correlation between each of the keywords from the important keywords $K_p$ with one or more of the segment keywords $K_c$. To illustrate, in one or more embodiments, the thumbnail generation system 106 identifies a first segment keyword from the segment keywords $K_c$ having the smallest Euclidean distance (d(x, y)) relative to the other segment keywords $K_c$ (e.g., a minimum Euclidean distance (d'(x, y))). Using this minimum Euclidean distance (d'(x, y)), the thumbnail generation system 106 determines a correlation for the first keyword based on a ratio of the minimum Euclidean distance (d'(x, y)) and the engagement score corresponding to the first keyword (e.g., from the record of keywords for the content sharing platform 206). In one or more embodiments, the thumbnail generation system 106 determines the correlation for the first keyword using the following formula:

$$\text{Correlation of first keyword} = \frac{d'(x, y)}{P_x}$$

where d'(x, y) refers to a Euclidean distance between the first keyword of the important keywords $K_p$ and an identified keyword from the segment keywords $K_c$ having the closest semantic relationship to the first keyword (e.g., an identified keyword from the segment keywords $K_c$ having the closest position in the d-dimensional space to the first keyword). In addition, $P_x$ refers to an engagement score corresponding to the first keyword (e.g., an engagement score corresponding to the first keyword from the record of keywords for the content sharing platform 206).

As mentioned above, the thumbnail generation system 106 can determine a correlation between each of the keywords of the important keywords $K_p$ and a corresponding keyword from the segment keywords $K_c$. In particular, the thumbnail generation system 106 can determine a correlation between each of the important keywords $K_p$ and a corresponding keyword from the segment keywords $K_c$ determined to have a minimum Euclidean distance (d'(x, y)) from a corresponding keyword of the important keywords $K_p$. The thumbnail generation system 106 can additionally determine a correlation score based on the determined correlations for each of the important keywords $K_p$. For example, in one or more embodiments, the thumbnail generation system 106 determines a correlation score for the segment by summing the calculated correlations for each of the important keywords $K_p$.

As an alternative, in one or more embodiments, the thumbnail generation system 106 determines the correlation score for a segment of the digital video 202 by iteratively updating a correlation score upon determining correlations for each of the important keywords $K_p$. For example, in one or more embodiments, the thumbnail generation system 106 initializes a correlation score (S) to zero. Upon determining a correlation for a keyword of the important keywords $K_p$, the thumbnail generation system 106 can generate an updated correlation score (S') by adding the correlation for the keyword to a current iteration of the correlation score. Accordingly, referring to the example above in which the thumbnail generation system 106 determines the correlation for the first keyword, the thumbnail generation system 106 can determine the correlation score (S) using the following equation:

$$S' = S + \frac{d'(x, y)}{P_x}$$

where S' refers to an updated correlation score in view of the determined correlation for the first keyword and S refers to a previous iteration of the correlation score prior to determining the correlation for the first keyword (initialized as S=0). In one or more embodiments, the thumbnail generation system 106 utilizes a similar process to determine a correlation score for each of the segments of the digital video 202.

As illustrated in FIG. 3, the thumbnail generation system 106 can additionally perform an act 322 of identifying a segment of interest. In particular, upon determining a correlation score for each of the segments of the digital video 202, the thumbnail generation system 106 can identify a segment of interest corresponding to a segment of the digital video 202 from which to generate a representative image predicted to effectively engage users of the networking system 112 via the content sharing platform 206. In one or more embodiments, the thumbnail generation system 106 identifies the segment of interest by identifying which segment of the digital video 202 has the lowest correlation score (e.g., indicating a high correlation between the segment and keywords associated with a high level of engagement on the content sharing platform 206).

Figure 4:
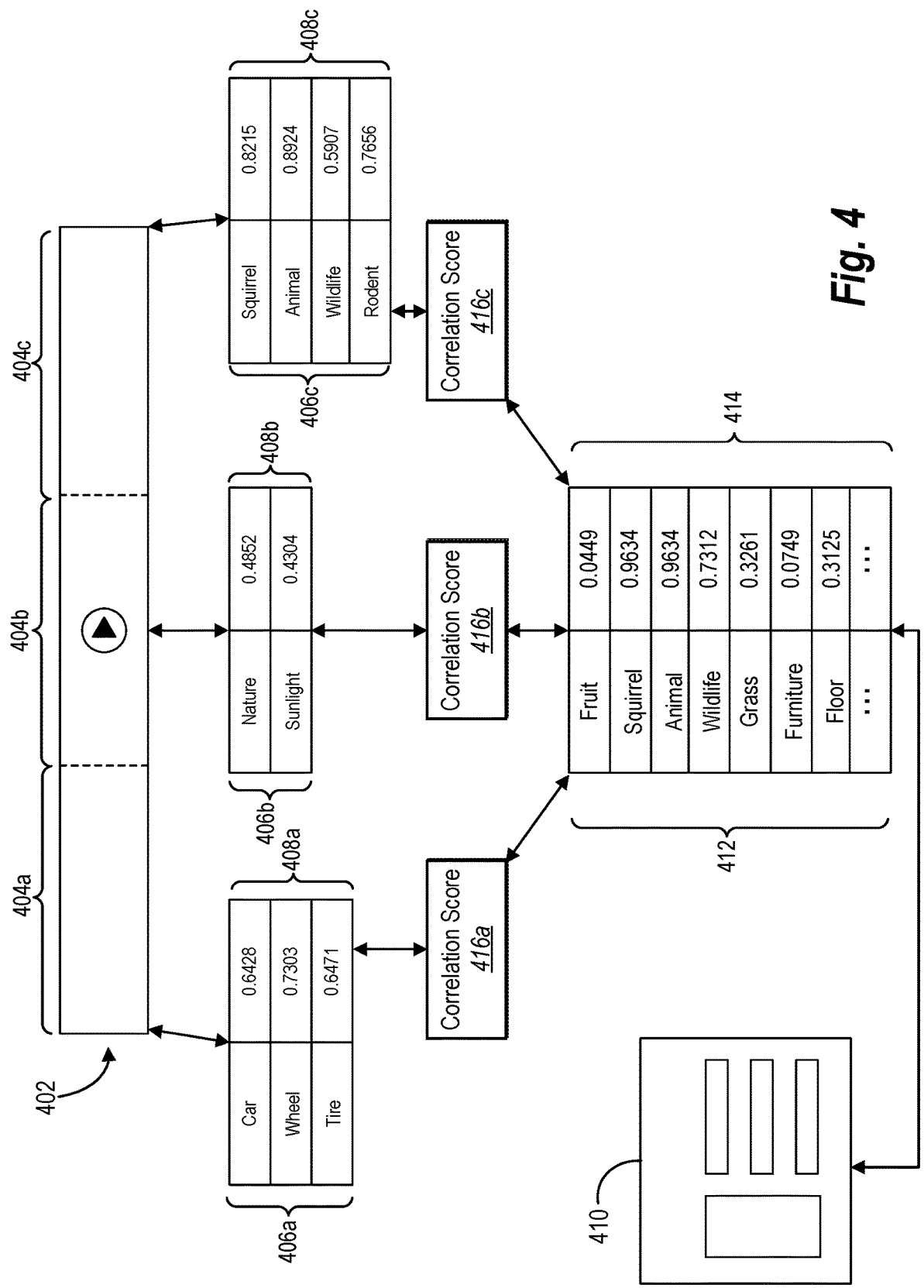
FIG. 4 illustrates an example embodiment in which a thumbnail generation system determines correlations between keywords of a digital video and keywords of a content sharing platform in accordance with one or more embodiments.

FIG. 4 illustrates an example process for identifying a segment of interest in accordance with one or more embodiments described herein. For example, as shown in FIG. 4, the thumbnail generation system 106 can identify a digital video 402 including segments 404a-c. Similar to one or more embodiments described above, the thumbnail generation system 106 can divide the digital video 402 into the segments 404a-c by identifying scenes of the digital video 402. Alternatively, the thumbnail generation system 106 can divide the digital video 402 into the segments 404a-c randomly, uniformly, or using other method(s) for dividing the digital video 402 into discrete clips.

As further shown, the thumbnail generation system 106 can analyze each of the segments 404a-c to determine segment keywords 406a-c associated with the respective segments 404a-c. In addition, the thumbnail generation system 106 can determine confidence values 408a-c corresponding to the segment keywords 406a-c. For example, the thumbnail generation system 106 can identify first segment keywords 406a including "car," "wheel," and "tire" and corresponding confidence values 408a, second segment keywords 406b including "nature" and "sunlight" and corresponding confidence values 408b, and third segment keywords 406c including "squirrel," "animal," "wildlife," and "rodent" and corresponding confidence values 408c. As indicated above, the thumbnail generation system 106 can determine the segment keywords 406a-c and corresponding confidence values 408a-c by performing a visual analysis, audio analysis, and/or textual analysis of content from the respective segments 404a-c of the digital video 402.

As further illustrated in FIG. 4, the thumbnail generation system 106 can analyze digital content items provided via the content sharing platform 410 to generate a record of keywords including keywords 412 associated with the content sharing platform 410 and corresponding engagement scores 414. As described above, the thumbnail generation system 106 can determine the keywords 412 associated with the content sharing platform 410 by extracting the keywords 412 from digital content items provided via the content sharing platform 410. In addition, the thumbnail generation system 106 can determine engagement scores 414 for the extracted keywords based on a number of interactions (e.g., likes, comments, shares) by users of the networking system 112 with respect to digital content items corresponding to the extracted keywords 412.

In addition, the thumbnail generation system 106 can determine correlation scores 416a-c for each of the segments 404a-c based on a comparison of the keywords 406a-c associated with the segments 404a-c and keywords 412 (and engagement scores 414) associated with the content sharing platform 414. For example, as discussed above, the thumbnail generation system 106 can determine a semantic relationship between each of the keywords 412 (or an identified subset of the set of keywords 412 determined to have higher importance than other keywords from the set of keywords 412) with each of the keywords 406a-c for the corresponding segments 404a-c of the digital video. In addition, the thumbnail generation system 106 can select a segment of interest by determining which of the segments 404a-c have a correlation score indicating a high correlation between the keywords associated with the segment of interest and the keywords 412 associated with the content sharing platform 410).

Upon identifying the segment of interest, the thumbnail generation system 106 can generate a representative image for the digital video 402 by identifying a video frame to use as a preview image when presenting the digital video 402 via the content sharing platform 410. For example, where the thumbnail generation system 106 determines that the third segment 404c has a lower correlation score than the first segment 404a or the second segment 404b, the thumbnail generation system 106 can disregard any frames of the first segment 404a and the second segment 404b and limit analysis to the third segment 404c to identify a video frame to use in generating a representative image for the digital video 402. Indeed, as mentioned above, by disregarding the first segment 404a and second segment 404b to focus additional analysis on the third segment 404c, the thumbnail generation system 106 can significantly reduce expense of processing resources when generating the representative image for the digital video 402.

Figure 5:
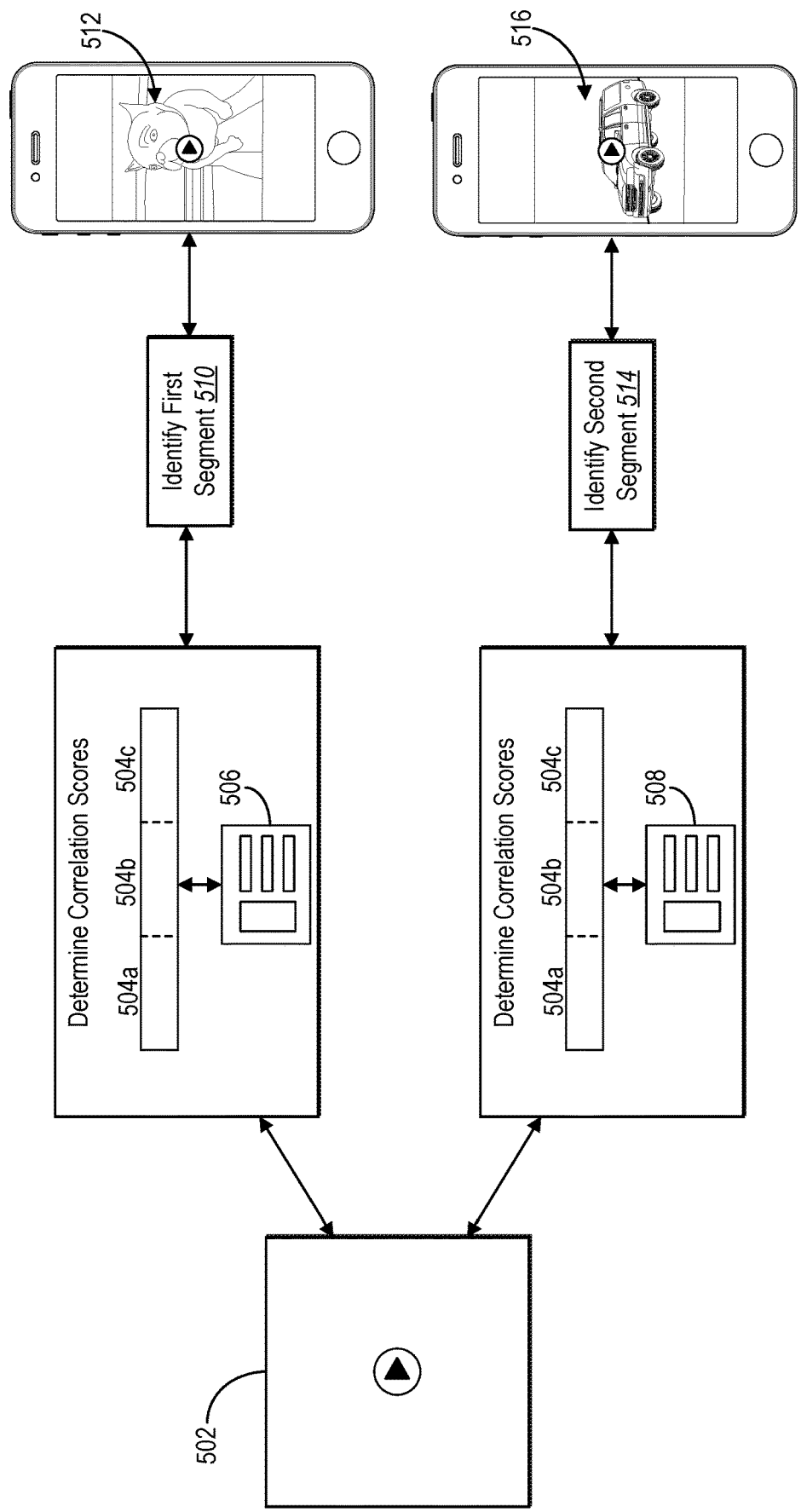
FIG. 5 illustrates an example embodiment in which a thumbnail generation system generates representative images of a digital video for presentation via different content sharing platforms in accordance with one or more embodiments.

By determining a segment of interest based on a correlation between keywords of the segments and a content sharing platform, the thumbnail generation system 106 can determine a different segment of interest to use when generating a representative image for different content sharing platforms. For instance, FIG. 5 illustrates an example embodiment in which the thumbnail generation system 106 identifies different segments of a digital video to use in generating different representative images for two different content sharing platforms. In particular, as shown in FIG. 5, the thumbnail generation system 106 receives or otherwise identifies a digital video 502 including segments 504a-c to provide to users of the communication system 112 via a first content sharing platform 506 and a second content sharing platform 508.

In particular, as shown in FIG. 5, the thumbnail generation system 106 can determine correlation scores between a plurality of terms associated with the first content sharing platform 506 and keywords associated with respective segments 504a-c of the digital video 502 to determine a segment of interest from the plurality of segments 504a-c. In particular, in accordance with one or more embodiments described above, the thumbnail generation system 106 can perform an act 510 of identifying the first segment 504a of the digital video 502 based on determining (e.g., based on the correlation score(s)) that keywords associated with the first segment 504a have a stronger correlation to engaging keywords of the first content sharing platform 506 relative to keywords associated with the second segment 504b and third segment 504c of the digital video 502.

The thumbnail generation system 106 can utilize a similar process to determine a different segment of interest from the plurality of segments 504a-c for a second content sharing platform 508. In particular, in accordance with one or more embodiments described above, the thumbnail generation system 106 can perform an act 514 of identifying the second segment 504b of the digital video 502 based on determining (e.g., based on the correlation score(s)) that keywords associated with the second segment 504b have a stronger correlation to engaging keywords of the second content sharing platform 508 relative to keywords associated with the first segment 504a and the third segment 504c of the digital video 502.

In providing the digital video 502 to users of the networking system 112 via the respective content sharing platforms 506, 508, the thumbnail generation system 106 can generate different representative images to provide as a selectable preview for the digital video 502. In particular, as shown in FIG. 5, the thumbnail generation system 106 can provide a first thumbnail image 512 including an identified video frame (e.g., a reduced resolution image of the video frame) from the first segment 504a to display via a graphical user interface of a client device accessing the first content sharing platform 506. As further shown, the thumbnail generation system 106 can provide a second thumbnail image 516 including an identified video frame from the second segment 504b to display via a graphical user interface of a client device accessing the second content sharing platform 508.

As indicated by the foregoing discussion, the thumbnail generation system 106 can identify a segment of interest for a digital video from which to generate a representative image for the digital video to provide via a display of a content sharing platform. Accordingly, the foregoing acts and algorithms described in relations to FIGS. 2-3 can comprise corresponding structure for a step for determining a representative image of the digital video for display via the content sharing platform based on a semantic relationship between a first plurality of keywords associated with digital content items provided via the content sharing platform and a second plurality of keywords associated with a plurality of segments of the digital video. As an example, the thumbnail generation system 106 can identify a segment of interest by utilizing the video content classifier 204 to identify keywords associated with segments of the digital video, utilizing the platform engagement classifier 208 to identify keywords associated with a content sharing platform, and utilizing the correlation model 210 to determine a segment of interest from the digital video and generate a representative image from the segment of interest predicted to engage users of the content sharing platform.

Figure 6:
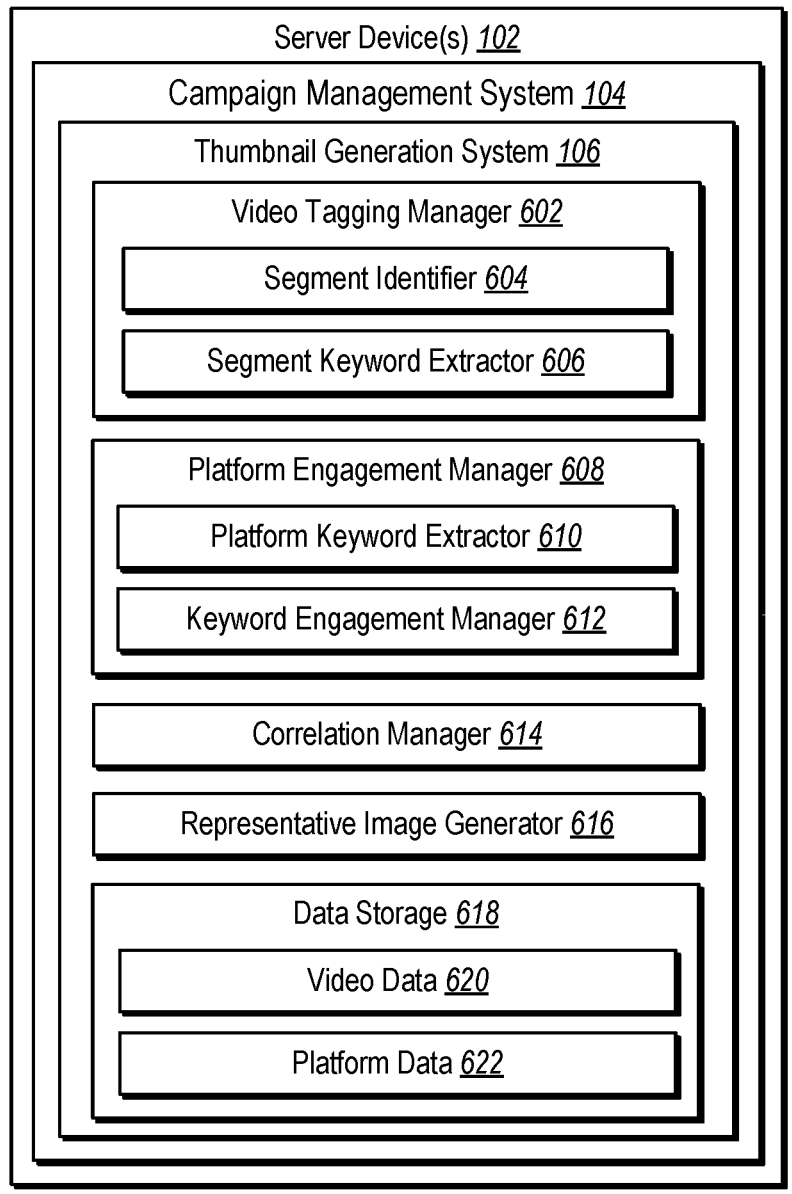
FIG. 6 illustrates a schematic diagram of an example architecture of a thumbnail generation system in accordance with one or more embodiments.

Turning now to FIG. 6, additional detail will be provided regarding components and capabilities of an example architecture of the thumbnail generation system 106. As mentioned above, the thumbnail generation system 106 can be implemented by a variety of computing devices including server device(s) 102, the content server device(s) 110, the client device 108, or a combination of multiple devices. In particular, FIG. 6 illustrates one implementation of the thumbnail generation system 106 implemented within a campaign management system 104 on the server device(s) 102 and having similar features and functionality associated with one or more embodiments described above. For example, the thumbnail generation system 106 can provide features and functionality for generating a representative image (e.g., a thumbnail image) for a digital video and providing the representative image as a preview of the digital video within a display of the content sharing platform on a client device.

As shown in FIG. 6, the thumbnail generation system 106 includes a video tagging manager 602, which includes a segment identifier 604 and a segment keyword extractor 606. The thumbnail generation system 106 additionally includes a platform engagement manager 608, which includes a platform keyword extractor 610 and a keyword engagement manager 612. As further shown in FIG. 6, the thumbnail generation system 106 includes a correlation manager 614, a representative image generator 616, and data storage 618, which includes video data 620 and platform data 622.

In one or more embodiments, each of the components of the thumbnail generation system 106 are in communication with one another using any suitable communication technologies. Additionally, the components of the thumbnail generation system 106 can be in communication with one or more other devices including the client device 108, server device(s) 102, and content server device(s) 110, as illustrated in FIG. 1. It will be recognized that although the components of the thumbnail generation system 106 are shown to be separate in FIG. 6, any of the subcomponents may be combined into fewer components, such as into a single component, or divided into more components as may serve a particular implementation. Furthermore, although the components of FIG. 6 are described in connection with the thumbnail generation system 106, at least some of the components for performing operations in conjunction with the thumbnail generation system 106 described herein may be implemented on other devices within the environment (e.g., environment 100).

The components of the thumbnail generation system 106 can include software, hardware, or both. For example, the components of the thumbnail generation system 106 can include one or more instructions stored on a computer-readable storage medium and executable by processors of one or more computing devices (e.g., the server device(s)). When executed by the one or more processors, the computer-executable instructions of the thumbnail generation system 106 can cause the server device(s) 102 to perform the methods described herein. Alternatively, the components of the thumbnail generation system 106 can comprise hardware, such as a special purpose processing device to perform a certain function or group of functions. Additionally or alternatively, the components of the thumbnail generation system 106 can include a combination of computer-executable instructions and hardware.

Furthermore, the components of the thumbnail generation system 106 performing the functions described herein with respect to the thumbnail generation system 106 may, for example, be implemented as part of a stand-alone application, as a module of an application, as a plug-in for applications including content management applications, as a library function or functions that may be called by other applications, and/or as a cloud-computing model. Thus, the components of the digital video selection system 106 may be implemented as part of a stand-alone application on a personal computing device or a mobile device. Alternatively or additionally, the components of the thumbnail generation system 106 may be implemented in any application that allows product and customer management, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are registered trademarks of Adobe Systems Incorporated in the United States and/or other countries.

As shown in FIG. 6, the thumbnail generation system 106 includes a video tagging manager 602 for identifying keywords associated with segments of a digital video for sharing via a content sharing platform. For example, upon receiving or otherwise identifying a digital video to share with users of the communication system 112 via a content sharing platform of the communication system 112, the video tagging manager 602 can identify one or more keywords associated with segments that make up the digital video.

As mentioned above, and as shown in FIG. 6, the video tagging manager 602 includes a segment identifier 604. In accordance with one or more embodiments described above, the segment identifier 604 can identify any number of segments of a digital video in a variety of ways. For example, the segment identifier 604 can detect scenes of the digital video and divide the digital video into segments corresponding to the detected scenes. Alternatively, in one or more embodiments, the segment identifier 604 divides the digital video into random and/or uniform length segments.

As further shown in FIG. 6, the video tagging manager 602 includes a segment keyword extractor 606. In accordance with one or more embodiments described above, the segment keyword extractor 606 can analyze content of the plurality of segments to identify keywords associated with respective segments of the digital video. For example, the segment keyword extractor 606 can analyze visual content, audio content, and/or textual content of the segments to extract one or more keywords associated with each of the segments.

As further shown in FIG. 6, the thumbnail generation system 106 includes a platform engagement manager 608 for identifying keywords associated with a content sharing platform and associated engagement levels. For example, in one or more embodiments, upon receiving a request to share the digital video with users of the communication system 112 via the content sharing platform, the platform engagement manager 608 can determine a set of keywords associated with the content sharing platform in accordance with one or more embodiments described herein.

As mentioned above, and as shown in FIG. 6, the platform engagement manager 608 includes a platform keyword extractor 610. In accordance with one or more embodiments described above, the platform keyword extractor 610 can analyze digital content items shared via the content sharing platform to identify keywords associated with the digital content items. For example, the platform keyword extractor 610 can analyze text of comments, documents, metadata or other digital content items having associated text to identify keywords associated with the digital content items. In addition (or as an alternative), the platform keyword extractor 610 can analyze visual content of images, video frames, or other digital content items to extract keywords.

In addition, the platform engagement manager 608 can include a keyword engagement manager 612. In particular, the keyword engagement manager 612 can determine an engagement score for the identified keywords. In one or more embodiments, the keyword engagement manager 612 determines the correlation scores by identifying a number of interactions by users of the communication system 112 with respect to the digital content items associated with the extracted keywords. The keyword engagement manager 612 can further calculate an engagement score based on the number of interactions with respect to the relevant digital content items.

As shown in FIG. 6, the thumbnail generation system 106 includes a correlation manager 614. In accordance with one or more embodiments described above, the correlation manager 614 can determine a correlation score between a set of keywords associated with the content sharing platform and one or more keywords associated with each of the respective segments of the digital video. In particular, the correlation manager 614 can determine correlation scores for the segments of the digital video based on a combination of a semantic relationship between the set of keywords associated with the content sharing platform and the one or more keywords associated with the respective segments of the digital video and engagement scores associated with the set of keywords. As discussed above, the correlation manager 614 can determine a correlation score for each of the segments of the digital video.

As further shown in FIG. 6, the thumbnail generation system 106 includes a representative image generator 616. In accordance with one or more embodiments described above, the representative image generator 616 can identify a representative image to use as a preview for the digital video within a display of the content sharing platform. In particular, in one or more embodiments, the representative image generator 616 identifies a segment of interest corresponding to a highest correlation score from the plurality of segments. In addition, the representative image generator 616 can determine or otherwise generate a representative image from the segment of interest. In one or more embodiments, the representative image generator 616 can provide (e.g., via a graphical user interface of a client device) the representative image as a preview for the digital video within a display of the content sharing platform.

As illustrated in FIG. 6, the thumbnail generation system 106 includes a data storage 618 including video data 620. The video data 620 can include any data from a digital video file corresponding to a digital video. For example, the video data 620 may include visual content, audio content, text content (e.g., text displayed within one or more frames of a digital video), or any data from the metadata of a digital video file.

As further shown, the data storage 618 includes platform data 622. The platform data 622 can include any data associated with a content sharing platform. For example, the platform data 622 includes data associated with digital content items shared via the content sharing platform including shared images, videos, comments, posts, documents, or other digital content items accessible to users of the communication system 112 via the content sharing platform. The platform data 622 can additionally include information about interactions by users of the communication system 112 with respect to digital content items shared via the content sharing platform.

Turning now to FIG. 7, this figure illustrates a flowchart including a series of acts 700 for identifying a segment of interest from a plurality of segments of a digital video and generating a representative image for the digital video from the identified segment of interest. While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

For example, the series of acts 700 includes an act 710 of determining a first set of keywords for a content sharing platform of a communication system 112. For instance, in one or more embodiments, the act 710 includes determining a first set of keywords for a content sharing platform of a communication system 112 corresponding to a plurality of digital content items shared with users of the communication system 112 via the content sharing platform. In one or more embodiments, the content sharing platform includes one or more of a webpage, a social media newsfeed, or a group page.

In one or more embodiments, determining the first set of keywords includes identifying a plurality of keywords associated with a subset of digital content items shared with users of the communication system via the content sharing platform. The subset of digital content items may include digital content items associated with a higher number of interactions by users of the communication system than other digital content items from the plurality of digital content items.

The series of acts 700 further includes an act 720 of identifying a digital video including a plurality of segments associated with a second set of keywords to share via the content sharing platform. For example, in one or more embodiments, the act 720 includes identifying a digital video to share via the content sharing platform where the digital video includes a plurality of segments associated with a second set of keywords and the second set of keywords includes one or more keywords corresponding to each of the plurality of segments. In one or more embodiments, identifying the digital video to share includes receiving a digital video advertisement to provide to users of the communication system 112 via the content sharing platform. In one or more embodiments, identifying the digital video to share includes receiving, from a client device associated with a user of the communication system 112, a request to share the digital video with the users of the communication system 112 via a post on the content sharing platform.

In one or more embodiments, the series of acts 700 includes dividing the digital video into the plurality of segments. For example, in one or more embodiments, the series of acts 700 includes detecting a plurality of scenes of the digital video. In addition, in one or more embodiments, the series of acts 700 includes dividing the digital video into the plurality of segments based on the detected plurality of scenes of the digital video.

In one or more embodiments, the series of acts 700 includes extracting one or more keywords from each segment of the plurality of segments. For example, in one or more embodiments, the series of acts 700 includes analyzing visual content of video frames of a segment to determine at least one keyword associated with the video frames of the segment. In addition, in one or more embodiments, the series of acts 700 includes analyzing audio content of the segment to determine one or more additional keywords associated with the audio content of the segment. The series of acts 700 can additionally include analyzing textual content of the segment to determine one or more additional keywords associated with the textual content of the segment.

The series of acts 700 further includes an act 730 of identifying a segment of interest from the plurality of segments based on a correlation score between one or more keywords corresponding to the segment of interest and the first set of keywords for the content sharing platform. For example, in one or more embodiments, the act 730 includes identifying a segment of interest from the plurality of segments based on a correlation score between one or more keywords corresponding to the segment of interest and the first set of keywords for the content sharing platform where the correlation score is based on a semantic relationship between the one or more keywords corresponding to the segment of interest and the first set of keywords for the content sharing platform.

In one or more embodiments, the series of acts 700 includes determining the correlation score(s) associated with the plurality of segments further based on engagement scores reflective of a level of engagement by users of the communication system 112 with respect to the plurality of digital content items associated with the first set of keywords. In one or more embodiments, the series of acts 700 includes determining engagement scores for the first set of keywords. In one or more embodiments, determining the engagement scores includes, for each keyword from the first set of keywords, identifying one or more digital content items from the plurality of digital content items associated with a keyword; and determining the engagement score for the keyword based on a number of interactions by users of the communication system 112 with respect to the one or more digital content items.

In one or more embodiments, the series of acts 700 includes determining semantic relationships between one or more keywords corresponding to each of the plurality of segments and the first set of keywords associated with the content sharing platform. In addition, in one or more embodiments, the series of acts 700 includes identifying the segment of interest by determining that the one or more keywords corresponding to the segment of interest have a closer semantic relationship with the first set of keywords than one or more keywords corresponding to other segments of the plurality of segments.

In one or more embodiments, determining the semantic relationships for the plurality of segments includes generating a plurality of vector representations corresponding to the first set of keywords for the content sharing platform. In addition, determining the semantic relationship for the segments may include, for each segment of the plurality of segments, generating one or more vector representations for the one or more keywords associated with a segment; and determining, for each vector representation of the plurality of vector representations, a distance on a vector plane from at least one or the one or more vector representations for the one or more keywords associated with the segment.

The series of acts 700 further includes an act 740 of determining a representative image from the segment of interest. For example, in one or more embodiments, the act 740 includes determining a representative image from the segment of interest. In one or more embodiments, determining the representative image includes generating a reduced-resolution image corresponding to a video frame from the segment of interest.

The series of acts 700 further includes an act 750 of providing the representative image within a display of the content sharing platform. For example, in one or more embodiments, the act 750 includes providing, via a graphical user interface of a client device, the representative image as a preview for the digital video within a display of the content sharing platform. In one or more embodiments, the series of acts 700 includes detecting a user selection of the representative image via the graphical user interface on the client device. In addition, in one or more embodiments, the series of acts 700 includes in response to detecting the user selection of the representative image, providing the digital video for display on the client device within the display of the content sharing platform.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
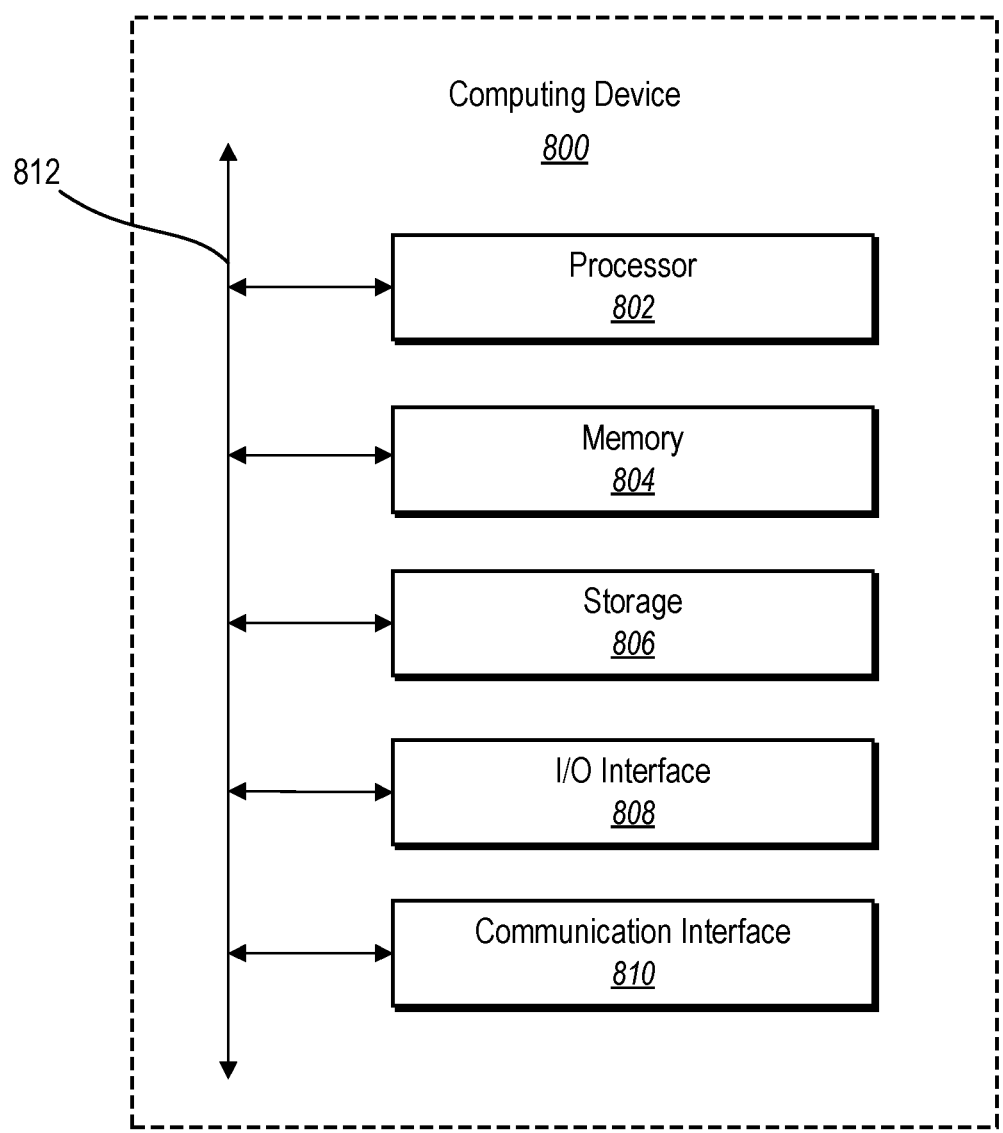
FIG. 8 illustrates a block diagram of an example computing device in accordance with one or more embodiments.

FIG. 8 illustrates a block diagram of exemplary computing device 800 that may be configured to perform one or more of the processes described above. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions for digitizing real-world objects, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions related to object digitizing processes (e.g., digital scans, digital models).

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   identifying, by a server device of a communication system, a digital video to provide to users of the communication system via a content sharing platform of the communication system;
   a step for determining a representative image of the digital video for display via the content sharing platform based on a semantic relationship between a first plurality of keywords associated with digital content items provided via the content sharing platform and a second plurality of keywords associated with a plurality of segments which divide the digital video into multiple discrete video clips of consecutive digital content, the representative image comprising a thumbnail image predicted to engage a user of the communication system via the content sharing platform; and
   providing, via a graphical user interface of a client device associated with the user, the representative image as a customized preview for the digital video within a display of the content sharing platform.

2. The method of claim 1, wherein identifying the digital video to share comprises receiving a digital video advertisement to provide to the users of the communication system via the content sharing platform.

3. The method of claim 1, wherein identifying the digital video to share comprises receiving, from the client device associated with the user of the communication system, a request to share the digital video with the users of the communication system via a post on the content sharing platform.

4. The method of claim 1, wherein the content sharing platform comprises one or more of a webpage, a social media newsfeed, or a group page.

5. A system comprising:
   at least one processor;
   a non-transitory computer readable medium storing instructions thereon that, when executed by at least one processor, cause the system to:
      determine a first set of keywords for a content sharing platform of a communication system corresponding to a plurality of digital content items shared with users of the communication system via the content sharing platform;
      identify a digital video to share via the content sharing platform, the digital video comprising a plurality of segments which divide the digital video into multiple discrete video clips of consecutive digital content and are associated with a second set of keywords, the second set of keywords comprising one or more keywords corresponding to each of the plurality of segments;
      identify a segment of interest from the plurality of segments based on a correlation score between one or more keywords corresponding to the segment of interest and the first set of keywords for the content sharing platform, wherein the correlation score is based on a semantic relationship between the one or more keywords corresponding to the segment of interest and the first set of keywords for the content sharing platform;
      determine a representative image from the segment of interest, the representative image comprising a thumbnail image predicted to engage a user of the communication system via the content sharing platform; and
      provide, via a graphical user interface of a client device associated with the user, the representative image as a customized preview for the digital video within a display of the content sharing platform.

6. The system of claim 5, wherein the correlation score is further based on engagement scores reflective of a level of engagement by the users of the communication system with respect to the plurality of digital content items associated with the first set of keywords.

7. The system of claim 6, further comprising instructions that, when executed by the at least one processor, cause the system to determine engagement scores for the first set of keywords, wherein determining the engagement scores comprises, for each keyword from the first set of keywords:
   identifying one or more digital content items from the plurality of digital content items associated with a keyword; and
   determining the engagement score for the keyword based on a number of interactions by the users of the communication system with respect to the one or more digital content items.

8. The system of claim 5, wherein determining the first set of keywords comprises identifying a plurality of keywords associated with a subset of digital content items shared with the users of the communication system via the content sharing platform, wherein the subset of digital content items comprises digital content items associated with a higher number of interactions by the users of the communication system than other digital content items from the plurality of digital content items.

9. The system of claim 5, further comprising instructions that, when executed by the at least one processor, cause the system to:
   determine semantic relationships between one or more keywords corresponding to each of the plurality of segments and the first set of keywords; and
   identify the segment of interest by determining that the one or more keywords corresponding to the segment of interest have a closer semantic relationship with the first set of keywords than one or more keywords corresponding to other segments of the plurality of segments.

10. The system of claim 9, wherein determining the semantic relationships between one or more keywords corresponding to each of the plurality of segments and the first set of keywords comprises:
    generating a plurality of vector representations corresponding to the first set of keywords for the content sharing platform; and
    for each segment of the plurality of segments:
    generating one or more vector representations for the one or more keywords associated with a segment; and
    determining, for each vector representation of the plurality of vector representations, a distance on a vector plane from at least one or the one or more vector representations for the one or more keywords associated with the segment.

11. The system of claim 5, further comprising instructions that, when executed by the at least one processor, causes the system to extract one or more keywords from each segment of the plurality of segments.

12. The system of claim 11, wherein extracting one or more keywords from the plurality of segments comprises, for each segment, analyzing visual content of video frames of the segment to determine at least one keyword associated with the video frames of the segment.

13. The system of claim 12, wherein extracting one or more keywords from the plurality of segments further comprises, for each segment:
analyzing audio content of the segment to determine one or more additional keywords associated with the audio content of the segment; or
analyzing textual content of the segment to determine one or more additional keywords associated with the textual content of the segment.

14. A non-transitory computer-readable storage medium comprising instructions thereon that, when executed by at least one processor, cause a computer system to:
determine a first set of keywords for a content sharing platform of a communication system corresponding to a plurality of digital content items shared with users of the communication system via the content sharing platform;
identify a digital video to share via the content sharing platform, the digital video comprising a plurality of segments which divide the digital video into multiple discrete video clips of consecutive digital content and are associated with a second set of keywords, the second set of keywords comprising one or more keywords corresponding to each of the plurality of segments;
identify a segment of interest from the plurality of segments based on a correlation score between one or more keywords corresponding to the segment of interest and the first set of keywords for the content sharing platform, wherein the correlation score is based on a semantic relationship between the one or more keywords corresponding to the segment of interest and the first set of keywords for the content sharing platform;
determine a representative image from the segment of interest, the representative image comprising a thumbnail image predicted to engage a user of the communication system via the content sharing platform; and
provide, via a graphical user interface of a client device associated with the user, the representative image as a customized preview for the digital video within a display of the content sharing platform.

15. The computer-readable storage medium of claim 14, wherein the correlation score is further based on engagement scores reflective of a level of engagement by the users of the communication system with respect to the plurality of digital content items associated with the first set of keywords.

16. The computer-readable storage medium of claim 14, further comprising instructions that, when executed by the at least one processor, cause the computer system to determine engagement scores for the first set of keywords, wherein determining the engagement scores comprises, for each keyword from the first set of keywords:
identifying one or more digital content items from the plurality of digital content items associated with a keyword; and
determining the engagement score for the keyword based on a number of interactions by the users of the communication system with respect to the one or more digital content items.

17. The computer-readable storage medium of claim 14, further comprising instructions that, when executed by the at least one processor, cause the computer system to divide the digital video into the plurality of segments by:
detecting a plurality of scenes of the digital video; and
dividing the digital video into the plurality of segments based on the detected plurality of scenes of the digital video.

18. The computer-readable storage medium of claim 14, wherein determining the representative image from the segment of interest comprises generating a reduced-resolution image corresponding to a video frame from the segment of interest.

19. The computer-readable storage medium of claim 14, further comprising instructions that, when executed by the at least one processor, cause the computer system to:
detecting a user selection of the representative image via the graphical user interface on the client device; and
in response to detecting the user selection of the representative image, providing the digital video for display on the client device within the display of the content sharing platform.

20. The computer-readable storage medium of claim 14, further comprising instructions that, when executed by the at least one processor, cause the computer system to extract one or more keywords from each segment of the plurality of segments, wherein extracting one or more keywords from the plurality of segment comprises, for each segment from the plurality of segments:
analyzing visual content of video frames of a segment to determine at least one keyword associated with the video frames of the segment;
analyzing audio content of the segment to determine one or more additional keywords associated with the audio content of the segment; and
analyzing textual content of the segment to determine one or more additional keywords associated with the textual content of the segment.

* * * * *